Nov. 14, 1967 W. G. MOONEY ET AL 3,352,532
CORROSION RESISTANT VALVE
Filed Feb. 26, 1965
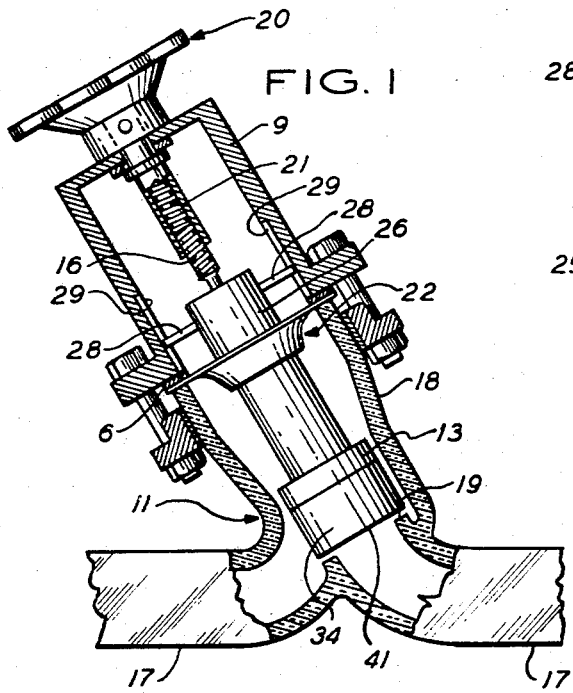
FIG. 1
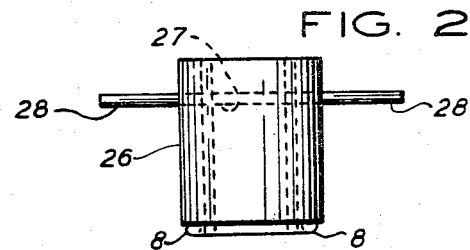
FIG. 2
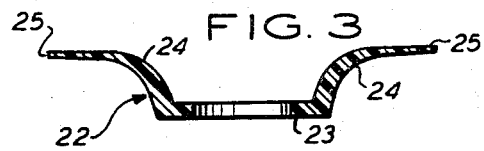
FIG. 3
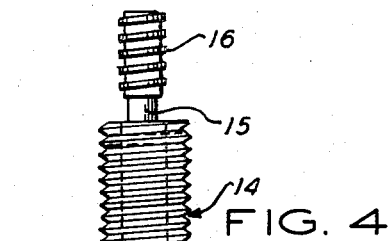
FIG. 4
FIG. 6
FIG. 7a
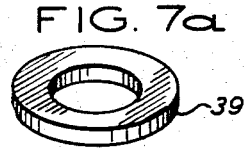
FIG. 7b
FIG. 8
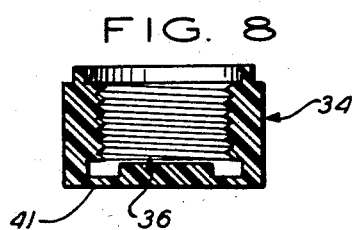
FIG. 9
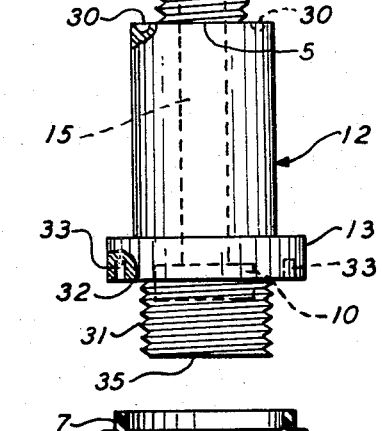
FIG. 5
INVENTORS
WALTER G. MOONEY
LLOYD K. DUTTON
FRANCIS K. LYNCH, JR
BY Norman N. Popper
ATTORNEY

United States Patent Office 3,352,532
Patented Nov. 14, 1967

3,352,532
CORROSION RESISTANT VALVE
Walter G. Mooney, 31 Brook Terrace, Wayne, N.J. 07470; Lloyd K. Dutton, 7 Westerholt Ave., West Paterson, N.J. 07506; and Francis K. Lynch, Jr., Awosting Road, Hewitt, N.J. 07421
Filed Feb. 26, 1965, Ser. No. 435,642
6 Claims. (Cl. 251—268)

The present invention relates to corrosion resistant valves generally and particularly to diaphragm type of valves having a resilient head.

It is an object of the invention to provide a corrosion resistant valve having a plug that engages a seat repeatedly in intimate sealing relationship.

It is a further object of the invention to provide a corsion resistant valve having a plug with a resilient insert securely enclosed therein against deterioration from contact with corrosive fluids.

Yet a further object of the invention is to provide a valve stem enclosed in a corrosion resistant sheath.

A still further object of the invention is to provide a diaphragm of corrosion resistant material, subject to repeated excursions without structural breakdown.

Yet a further object of the invention is to provide a corrosion resistant valve having a plug which does not rotate.

Another object of the invention is to provide a valve stem for a corrosion resistant valve which is capable of linear movements axially within the valve housing.

A still further object of the invention is to provide a construction having a relatively rigid valve stem core that maintains a constant coaxial position, that does not deflect as it responds to axial forces seating and unseating the plug in the valve seat and which stem further does not rotate.

Among the further objects of the invention is to provide a unitary corrosion resistant sheath and diaphragm for a valve stem.

These objects and advantages are attained by the device shown in the drawings in which:

FIGURE 1 is a vertical sectional view of a valve housing and bonnet.
FIGURE 2 is a vertical sectional view of a retainer.
FIGURE 3 is a partial vertical sectional view of a diaphragm.
FIGURE 4 is a vertical sectional view of a valve stem.
FIGURE 5 is a vertical sectional view of a plug head.
FIGURE 6 is a vertical sectional view of an insert for the plug shown in FIGURE 5.
FIGURES 7a and b are vertical sectional views of a two piece insert for a plug head.
FIGURE 8 is a vertical sectional view of a variant form of a plug head.
FIGURE 9 is a vertical sectional view of a one piece insert for the variant form of a plug head shown in FIGURE 8.

Conducting corrosive fluids through conduits is a common practice, and such a flow must be controlled by a corrosion resistant valve, capable of tight sealing and great durability. Such materials as polytertrafluoroethylene, commonly known by the trade name "Teflon" and trifluoromonocholoroethylene, commonly known by the trade name "Kel-F" naturally suggest themselves by reason of their staunch resistance to corrosion. Unfortunately these materials are relatively rigid and non-resilient. Under sealing pressure, they deform so that accurate and repeated sealing engagement of a valve plug with a valve seat soon ceases to exist when these materials are used. Other plastic materials are not corrosion resistant although they may be resilient and repeatedly capable of intimate sealing engagement of parts made from them. Even when the rigid plastic materials are adapted by the inclusion of plasticizers so that they can continuously serve their sealing function, their very ability to yield resiliently to pressure does not render them suitable because the included plasticizer subjects the entire structure to deterioration under the influence of corrosive fluids. The use of these corrosion resistant rigid plastic materials for diaphragms in valves has been accompanied by early failure and short life of the diaphragm because of the nonresilient character of the material.

It has been found that it is possible to use these rigid materials for a diaphragm which is nevertheless capable of repeated flexing without deterioration; it has been further found possible to form a composite plug on the valve stem which, though made of rigid material, is further nevertheless endowed with resilience by including therein a reinforcement of resilient material sealed within the plug against deterioration by contact with corrosive materials.

Referring now to the drawings in detail, there is a valve stem 12, having an integral head 13. The head is generally a radially enlarged portion, part of which is a separate structure hereinafter set forth in detail. The top 14 of the valve stem is provided with an axial extension of lesser cross sectional diameter than the valve stem and externally threaded. A core 15 is disposed coaxially in the center of the valve stem 12. Core 15 has a bottom radial enlargement 10, which gives rigidity to the valve stem 12 at its head 13, just as the core itself gives rigidity and stability longitudinally to the valve stem 12. The top of the core 15 is provided with a threaded end 16. The valve stem 12 is positioned in a valve housing 11 which is essentially a straight section 17 and an offset portion 18. Fluid flows through the straight section 17 of the housing 11, passes through offset portion 18 which has an annular seat 19 which is engageable with the bottom of the valve stem 12. The housing 11 is provided with a bonnet 9 having a key 20 mounted for rotation at the top thereof. This key 20 is provided with a threaded internal bore 21. This bore is engageable with the threaded end 16 of the core 15, and when rotated, produces axial movement of the valve stem 12, engaging and disengaging the end of the stem 12 from the seat 19. In the form of valve stem illustrated in FIGURE 4 a diaphragm 22 is carried on the valve stem on a shoulder or seat 5 which is at the top portion 12. The diaphragm 22 has a generally flat radial portion 23 and a radial enlargement 24 extending in an upward and outward direction. This enlargement 24 has a reduced cross sectional area as it extends outwardly from the radial portion 23, i.e., it becomes progressively thinner from the radial portion 23 to the outer tip or edge 25. The diaphragm 22 is engaged with the valve stem 12 by a retainer 26 which is a generally tubular member having a threaded internal bore which is engaged with the external threads on the top 14. In addition, the retainer 26 has a pair of radial threaded bores 27. These bores receive the threaded locating pins 28—28. The bonnet 9 has a pair of tracks or grooves 29 which receive the locating pins 28 and prevent rotation of the valve stem 12, permitting however axial movement of the valve stem 12 as the pins 28 slide up and down on the tracks 29 in response to the rotation of the key 20, acting upon the core 15. The tracks 29 are coaxial with the longitudinal axis of the valve 12. In the form of the valve stem 12 shown in FIGURE 4, the diaphragm 22 is formed separate from the valve stem 12. It may however be formed integrally thereby dispensing with the need for the retainer 26 to hold the diaphragm 22 in place, in which case the locating pins 28—28 would pass through the top 14 and the core 15.

Where the separate diaphragm 22 as shown in FIGURE 3 is provided, the diaphragm 22 may be held in sealing engagement with the shoulder 5 by providing cooperative annular channels 30 and ribs 8 on the valve stem 12 and the retainer 26, so that the diaphragm 22 will be firmly seized between them.

The head 13 is provided with an externally threaded constricted end portion 31 which is defined by a shoulder 32. The shoulder has an annular channel 33. A cap 34, which is internally threaded, is engaged with the external thread on the end portion 31 of the head 13. The cap has a vertical axial rib or enlargement 7 engageable with the channel 33. A space is provided between the bottom of the cap on the inside and the bottom 35 of the head 13. This space or cavity may have a number of shapes. For example, it may be annular as shown in FIGURE 8 with an upstanding central portion 36 thereby to receive the annulus 37. The space between the cap 34 and the head 13 may be disc shaped (see FIGURE 5) to accommodate an insert disc 38 shown in FIGURE 6. Instead of the unitary inserts 37, 38, a composite insert as shown in FIGURES 7a, 7b may be used, combining the annulus 39 with the insert 40. The portion of the housing 11 through which a corrosive fluid may flow may be of glass or some other corrosion resistant material and the valve head 13, the cap 34, the valve stem 12 and the diaphragm 22 are all of corrosion resistant material. These materials are notoriously rigid and nonresilient; compressive forces deform them. Thus, the cap 34, which does not rotate will engage the seat 19, and with increased pressure in elevated temperatures, will receive a rigid impression of the seat 19. The inclusion of the annulus 37 in the cap 34, or the disc 38 in the disc shaped cavity as shown in the species of cap shown in FIGURE 5 or the composite disc 40 and annulus 39 as shown in FIGURES 7a, 7b will substantially overcome deformation of the cap 34 from repeated engagement of the seat 19. This is accomplished by making the annulus 37 or the disc 38 of relatively resilient compressible material. Thus when the face 41 engages the seat 19, it may deform inwardly and compress the annulus 37 or disc 38. When the pressure is relieved, the annulus 37 or disc 37 or the composite annulus 39 and 40 will tend to expand when the compressive force is relieved, and restore the face 41 to its normal external flat contour. Since the annulus 37, disc 38 and annulus 39 are resilient, and since most materials of this character are not resistant to corrosion, the channel 33 and the enlargement 7 must seal with each other to protect the resilient inserts 37, etc., from damage by intrusion of the corrosive fluid into the cavity between the bottom 35 and the bottom 4. Although the enlargement 7 and its corresponding channel 33 have been shown as having a generally rectangular cross section configuration their engaging surfaces may be modified such as by the substitution of concave and convex seals, cone in socket seals, truncated cone in socket seals, ball and socket seals. Without a compressible insert, the corrosive resistant cap 34 would very soon deform in accordance with the pressure exerted by the annular seat 19 and would soon cease to give a firm seal. Without the sealing engagement between the channel 33 and enlargement 34 the compressible inserts 37, 38 would soon be corroded and destroyed. The rigid reinforcing stem 15 is important to insure precise linear movement of the valve stem 12. The locating pins 28—28 riding in the tracks 29—29 ensure against rotation of the valve stem 12; rotation of the stem 12 inevitably would produce deformation of the cap 34 at the point of engagement of the annular seat 19. A tight seal would quickly be lost. The locating pins 28, 28 likewise serve to prevent torsional stress from being exerted upon the diaphragm 22 at the point where it is seized between the housing 11 and the bonnet 9. The progressive reduction in cross sectional area of the diaphragm 22 from the center to the peripheral edge 25 vastly increases the capacity of the diaphragm 22 to flex in response to the axial movement of the valve stem 12, thereby insuring a greatly extended life for the diaphragm 22. The use of a rubber or sponge elastomer for the insert 37 or annulus or the disc 28 or the annular portion 39 of the composite insert gives to the hard, rigid, nonresilient cap 34 a quality of resiliency and vastly enlarges its life, by preventing deformation.

A further and outstanding advantage of the construction is that the cap 34, if due to abrasive wear has lost its capacity to firmly seal the opening defined by the annular seat 19, can be easily unscrewed and replaced by a new cap 34 without discarding the entire valve stem 12 or any other still useful, unworn parts of the valve assembly. The form of the cap and insert shown in FIGURE 8 is particularly adapted to a vacuum service as it has greater dimensional stability in contrast with the form as shown in FIGURE 5 which is more suitable for a flow type service. In assembling the valve, a gasket 6 is interposed between the top of the diaphragm 22 and the bottom of the bonnet 9. In effect, the elastomeric inserts 37, 38, 39 endow the rigid cap 34 with the ability to recover from deformation, but the material used would not by itself recover.

Although the diaphragm is shown as a non-composite structure, a laminated reinforcement may be applied, to give strength and life to the diaphragm 22. Since the material of which the value stem is made is deformable without being resilient, a rigid metal core 15 is utilized to impart axial stability to the head 13.

The construction provides a valve with an exceedingly long life which is readily renewable at the point of principal wear the cap 34. Likewise in the form of the invention shown in FIGURE 4 (a separate diaphragm as shown in FIGURE 3), in the other part which deteriorates (the diaphragm 22) can also readily be replaced. The face 41 becomes resistant to permanent deformation, and has a long and efficient life for tightly closing the valve.

It will be understood that various changes in the details, materials and arrangements of parts which have been herein described and illustrated in order to explain the nature of the invention may be by those skilled in the art within the principles and scope of the invention as expressed in the claims.

What is claimed is:
1. A corrosion resistant valve comprising:
(a) a corrosion resistant housing with a flow-passage therethrough,
(b) a bonnet attached to the housing,
(c) a valve seat in the flow-passage,
(d) a corrosion resistant valve stem in the housing,
(e) a pin attached to the valve stem extending laterally therefrom, and disposed in sliding contact with an axial groove in the bonnet for permitting axial movement of the valve stem without torsional movement,
(f) means in the bonnet engaged with the one end of the valve stem to move it axially to and from the valve seat,
(g) a flexible, corrosion resistant, concave diaphragm
(h) a relatively thick inner portion of the diaphragm attached to the valve stem,
(i) a relatively thin outer portion of the diaphragm seized between the housing and the bonnet,
(j) an intermediate portion of the diaphragm extending in an upward and outward direction, tapered from the inner thick portion to the outer thin portion,
(k) a corrosion resistant cap attached to the other end of the valve stem,
(l) a generally flat face on the cap engageable with the valve seat,
(m) a rigid core in the valve stem, and the valve stem defining a protective sheath for the core,
(n) a radial enlargement on the bottom of the rigid core inside the valve stem, and opposite the flat face,
(o) a cavity between the other end of the valve stem and the inside of the cap and positioned generally op- posite the area of engagement of the face of the cap with the seat,
(p) a resilient filler in the cavity.

2. A corrosion-resistant valve comprising:
(a) the device according to claim 1, and,
(b) the cavity being annular,
(c) the filler being annular.

3. A corrosion-resistant valve comprising:
(a) the device according to claim 1, and,
(b) the cavity being disc shaped,
(c) the resilient filler being annular,
(d) a relatively rigid disc in the center of the filler.

4. A corrosion-resistant valve comprising:
(a) the device according to claim 1, and,
(b) the cavity being generally disc-shaped,
(c) the resilient filler being generally disc shaped.

5. A corrosion-resistant valve comprising:
(a) the device according to claim 1, and,
(b) a retainer attaching the diaphragm to the valve stem.

6. A corrosion-resistant valve comprising:
(a) the device according to claim 1, and,
(b) opposing annular rib and cooperative channel on the bottom of the retainer and the top of the valve stem, whereby to grip the diaphragm.

References Cited

UNITED STATES PATENTS

| | | | |
|---|---|---|---|
| 1,976,796 | 10/1934 | Milner | 251—335 X |
| 2,047,764 | 7/1936 | Beggs | 251—335 X |
| 2,699,801 | 1/1955 | Schleyer | 251—335 X |
| 2,842,400 | 7/1958 | Booth et al. | 251—331 X |
| 2,982,512 | 5/1961 | Hurley | 251—367 X |
| 3,043,555 | 7/1962 | Breher | 251—214 X |

ALAN COHAN, Primary Examiner.

D. R. MATTHEWS, Assistant Examiner.